United States Patent [19]

Dill

[11] Patent Number: 5,294,353
[45] Date of Patent: Mar. 15, 1994

[54] METHODS OF PREPARING AND USING STABLE OIL EXTERNAL-AQUEOUS INTERNAL EMULSIONS

[75] Inventor: Walter R. Dill, Duncan, Okla.

[73] Assignee: Halliburton Company, Duncan, Okla.

[21] Appl. No.: 722,764

[22] Filed: Jun. 27, 1991

[51] Int. Cl.$^5$ .............................................. E21B 43/22
[52] U.S. Cl. .................................. 252/8.553; 252/309
[58] Field of Search .............................. 252/309, 8.553

[56] References Cited

U.S. PATENT DOCUMENTS

| | | | |
|---|---|---|---|
| 2,681,889 | 6/1954 | Menaul et al. | 252/8.553 |
| 2,751,348 | 6/1956 | Brainerd, Jr. | 252/8.553 |
| 3,136,728 | 6/1964 | Power | 252/309 X |
| 3,175,981 | 3/1965 | Power | 252/309 X |
| 3,377,293 | 4/1968 | Shepherd | 252/309 |
| 3,956,145 | 5/1976 | Christopher, Jr. et al | 252/309 X |
| 3,962,102 | 6/1976 | Crowe | 252/8.553 |
| 4,350,605 | 9/1982 | Hughett | 252/309 X |
| 4,446,051 | 5/1984 | Berthod et al. | 252/309 |

*Primary Examiner*—Gary Geist
*Attorney, Agent, or Firm*—Cliff Dougherty, III; Robert A. Kent

[57] ABSTRACT

Methods of preparing and using stable oil external-aqueous internal emulsions in subterranean formation acidizing, diverting and other treatments are provided. The emulsions can be prepared by batch or continuous mixing by combining the aqueous liquid having a particulated silica compound slurried therein with the oil having a surface active agent which promotes the formation of the emulsion mixed therewith.

20 Claims, No Drawings

METHODS OF PREPARING AND USING STABLE OIL EXTERNAL-AQUEOUS INTERNAL EMULSIONS

BACKGROUND OF THE INVENTION

1. Field of the Invention

The present invention relates generally to improved methods of preparing and using stable oil external-aqueous internal emulsions in oil field applications.

2. Description of the Prior Art

In the stimulation of oil and gas production from a subterranean formation penetrated by a well bore, one heretofore commonly utilized technique is to contact the formation with an aqueous acid solution whereby the acid solution reacts with materials in the formation to form enlarged flow channels therein.

When such acidizing procedures are carried out in formations having naturally low permeabilities, the acid must be delivered deeply into the formation before it spends in order to increase the hydrocarbon productivity of the formation. That is, the increase in the hydrocarbon productivity of a low permeability formation is proportional to the enlargement of the flow channels and distance from the well bore to which acid etching of the formation occurs.

Various techniques have heretofore been developed for retarding the rate at which the acid spends itself in a formation and thereby causing live acid to be delivered into the formation at greater distances from the well bore. The techniques include retarding an aqueous acid solution by forming an oil external-aqueous acid internal emulsion therewith. Such an emulsion has a relatively high viscosity which prevents rapid fluid loss and diffusion of the acid into the formation, and because the emulsion is oil external, i.e., the oil is the continuous phase in which the aqueous acid is dispersed, the spending of the acid on formation materials is retarded whereby deep penetration into the formation with live acid can be accomplished. As the acid in the emulsion contacts and reacts with materials in the formation the emulsion is broken.

High viscosity oil external-aqueous internal emulsions have also been prepared from brines and utilized in oil field applications as diverting agents. That is, a relatively high viscosity oil external-aqueous internal emulsion has been prepared and placed into high permeability zones in subterranean formations such as fractures, thief zones, vugs and the like. The high viscosity emulsion functions to plug the high permeability zones whereby fluids subsequently injected or produced from the formations are diverted away from such zones.

While oil external-aqueous internal emulsions have been successfully prepared and utilized heretofore in the above and other oil field applications, a problem associated with such emulsions is their difficulty of preparation. That is, the preparation of such emulsions has heretofore required high shear batch mixing for relatively long periods of time on the surface prior to introduction of the emulsions into wells. Such surface batch mixing is both time consuming and expensive, particularly where large volumes of the emulsion are required. Thus, there is a need for improved methods of preparing and using oil external-aqueous internal emulsions whereby the emulsions can be rapidly prepared, preferably continuously.

SUMMARY OF THE INVENTION

The present invention meets the need described above by providing methods of preparing and using stable oil external-aqueous internal emulsions wherein the emulsions can be prepared relatively quickly and continuously.

The method of preparing a stable oil external-aqueous internal emulsion of this invention comprises the steps of mixing a particulated silica compound with an aqueous liquid to form an aqueous slurry; mixing oil with a surface active agent which promotes the formation of an oil external-aqueous internal emulsion; and then combining the aqueous slurry and the oil-surface active agent mixture to form a stable oil external-aqueous internal emulsion.

The presence of the particulated silica compound causes the oil external-aqueous internal emulsion to be quickly formed and allows the emulsion to be formed continuously. That is, continuous streams of the aqueous slurry and the oil-surface active agent mixture can be continuously combined, e.g., in one or more pumps, to form a continuous stream of the emulsion. Methods of treating a subterranean formation penetrated by a well bore using the stable oil external-aqueous internal emulsions prepared as above are also provided.

It is, therefore, a general object of the present invention to provide improved methods of preparing and using stable oil external-aqueous internal emulsions.

Another object of the present invention is the provision of methods of preparing stable oil external-aqueous internal emulsions in large volumes relatively quickly and continuously.

Other and further objects, features and advantages of the present invention will be readily apparent to those skilled in the art upon a reading of the description of preferred embodiments which follows.

DESCRIPTION OF PREFERRED EMBODIMENTS

Stable oil external-aqueous internal emulsions are particularly suitable for carrying out stimulation and other treatments in oil and gas wells. For example, such emulsions are well suited for use in acidizing subterranean formations of low permeability whereby flow channels are etched in the formations which extend from the well bores penetrating the formations relatively long distances into the formations. The flow channels provide relatively large passageways for hydrocarbons to accumulate and flow from the formations to the well bores. The oil external-aqueous acid solution internal emulsions utilized have high viscosity, and therefore do not rapidly loose fluids to formations and diffuse therein. Further, because aqueous acid solutions are the internal phases of the emulsions, the acid solutions are retarded whereby they do not quickly spend and can be transported long distances in formations before becoming spent.

Other example of oil and/or gas well treatments in which oil external-aqueous internal emulsions are particularly suitable are treatments for causing fluids injected into subterranean formations or produced therefrom to be diverted away from high permeability zones such as fractures, thief zones, vugs and the like. High viscosity oil external-water internal emulsions are placed in such zones whereby the zones are sealed or plugged and subsequently injected or produced aqueous fluids are readily diverted therefrom.

The method of the present invention for preparing a stable oil external-aqueous internal emulsion comprises the preliminary step of mixing a particulated silica compound with the aqueous liquid used to form an aqueous slurry. As mentioned above, the presence of the particulated silica compound in the aqueous liquid when it is combined with oil and a selected surface active agent causes an oil external-aqueous internal emulsion to be quickly formed whereby, if desired, the emulsion can be formed continuously. However, the particle size of the particulated silica compound utilized is important, and if such particle size is too large, the desired rapid formation of the emulsion will not result.

To achieve the quick emulsion formation required, the particulated silica compound utilized should have particles ranging in size of from about 5 microns to about 500 microns with at least about 16% of the total particles being of a size less than 20 microns.

Preferred silica compounds are hydrated silica and sodium silica aluminate having a particle size in the range of from about 3 microns to about 60 microns and having at least about 80% of the total particles of a size less than 20 microns. A commercially available such particulated hydrated silica is sold by the J. M. Huber Corporation of Borger, Tex., under the tradename Zeofree 80 ™. A commercially available sodium silica aluminate of the above particle size is sold under the tradename Zeofree 23A ™ by the same company.

When the oil external-aqueous internal emulsion is utilized in acidizing procedures, the aqueous liquid is an aqueous acid solution. As is well known by those skilled in the art, various acid solutions can be used including hydrochloric acid, acetic acid, and formic acid solutions having acid concentrations in the range of from about 1% to about 40% by weight of solution. Acetic acid and/or citric acid and/or erythorbic acid may be included in the acid solution to sequester dissolved iron. Also, iron chelating agents such as ethylenediaminetetraacetic acid and nitrilotriacetic acid can be used. Generally, an aqueous hydrochloric acid solution is preferred as the primary acid having an acid concentration in the range of from about 1% to about 38% by weight of solution. When the emulsion is utilized in a fluid diverting treatment, the aqueous phase can be fresh water, brine or sea water.

The quantity of the particulated silica compound combined with the aqueous solution used is generally in the range of from about 10 lbs. to about 40 lbs. of particulated silica compound per 1000 gallons of aqueous liquid. Preferably, the quantity of particulated silica mixed with the aqueous solution is in the range of from about 10 lbs. to about 30 lbs. per 1000 gallons of aqueous solution.

A next step in the preparation method, which can be performed before or after mixing the particulated silica compound with the aqueous solution used involves the oil phase of the emulsion. A surface active agent which promotes the formation of an oil external-aqueous internal emulsion is mixed with the oil utilized. A variety of such surface active agents which function as emulsifying agents in oil and water mixtures and which are well known to those skilled in the art can be utilized. Examples of such surface active agents are a mixture of 36% by weight heavy aromatic naphtha and 64% by weight of nonionic and cationic emulsifiers and a mixture of 20% by weight isopropyl alcohol and 80% by weight hydroxyethyl tall oil. The most preferred such surface active agent is the above described mixture of heavy aromatic naphtha and nonionic and cationic emulsifiers.

The oil used is preferably crude oil or diesel oil with diesel oil being the most preferred. The surface active agent used is generally mixed with the oil in an amount which results in the emulsion containing in the range of from about 2.5 gallons to about 15 gallons of surface active agent per 1000 gallons of emulsion, preferably about 10 gallons of surface active agent per 1000 gallons of emulsion.

The mixing of the particulated silica compound with the aqueous solution and the mixing of the surface active agent with the oil are performed separately utilizing conventional batch or continuous mixing apparatus.

The aqueous phase, i.e., the particulated silica compound-aqueous solution mixture and the oil phase, i.e., the surface active agent-oil mixture are next combined to form the oil external-aqueous internal emulsion. While the combining of the aqueous phase and oil phase can be performed in batch mixing apparatus, it is preferably performed continuously. That is, continuous streams of the aqueous particulated silica compound slurry and the oil-surface active agent mixture are preferably combined in a high shear mixing apparatus to continuously form a stream of the emulsion. The particular type of high shear mixing apparatus used can vary so long as it produces high shear and sufficient residence time, but preferably such apparatus is comprised of one or more centrifugal pumps. To start the continuous emulsion formation process, an initial emulsion referred to hereinafter as a "precursor emulsion" is formed first, followed by the full flow continuous emulsion formation. The precursor emulsion can be conveniently formed by initially partially closing an outlet valve on a centrifugal pump or pumps to hold the oil and aqueous phases in the pumps until a good emulsion is formed. The outlet valve is then slowly opened to increase the flow rate to the desired flow rate. An alternate technique is to flow the full flow rate of oil phase through the pumps while slowly increasing the flow rate of the aqueous phase from no flow to full flow to form the precursor emulsion followed by the full flow emulsion. The emulsion thus formed flows into the inlet of a high pressure pump for injection into a well.

The quantity of aqueous silica compound slurry combined with the oil-surface active agent mixture is preferably such that a volume ratio of aqueous slurry to oil-surface active agent mixture in the range of from about 4:1 to about 3:1 results. The resulting oil external-aqueous internal emulsion is stable, i.e., separation of the aqueous and oil phases will not take place in a time period of less than about 2 hours. The particular time that the emulsion remains stable depends on the concentrations of the components utilized and can be varied from about 2 hours to several days. Generally, the more particulated silica compound and surface active agent included in the emulsion, the longer it will remain stable.

The methods of the present invention for treating a subterranean formation penetrated by a well bore are comprised of the steps of mixing a particulated silica compound having a particle size in the range of from at least about 5 microns to about 500 microns and having at least about 16% of the total particles of a size less than 20 microns with an aqueous liquid to form an aqueous slurry; mixing oil with a surface active agent which promotes the formation of an oil external-aqueous internal emulsion; combining the aqueous slurry and the oil-surface active agent mixture to form an oil external-aqueous internal emulsion; and introducing the oil external-aqueous internal emulsion into the formation to be treated by way of the well bore.

In carrying out a subterranean formation acidizing treatment, a fluid diverting treatment or the like using the stable oil external-aqueous internal emulsion produced in accordance with this invention, it is preferred that the emulsion be continuously prepared as described above using one or more pumps as the high shear mixing apparatus, and conducting the continuous stream of emulsion formed from the one or more pumps to the well bore whereby the emulsion is introduced into the formation.

As will be understood by those skilled in the art, the steps of mixing the particulated silica compound with the aqueous liquid used to form an aqueous slurry and mixing oil with a surface active agent to form a mixture thereof can be performed by batch mixing or continuous mixing. In either case, the emulsion is preferably formed by conducting continuous metered streams of the mixtures to high shear mixing apparatus wherein the emulsion is continuously formed followed by introducing the emulsion into the well bore penetrating the formation to be treated.

In order to further illustrate the methods of the present invention, the following examples are given.

EXAMPLE 1

Laboratory tests were performed to compare oil external-aqueous acid internal emulsions using a mixing procedure designed to simulate the continuous formation of the emulsions. In each test, the oil phase was comprised of diesel oil containing a surface active agent comprised of heavy aromatic naphtha (36% by wt.) mixed with nonionic and cationic emulsifiers (64% by wt.) in an amount to provide a concentration of 10 gallons of surfactant per 1000 gallons of emulsion formed. The aqueous acid phase was comprised of a 10% aqueous hydrochloric acid solution containing 0.2% by volume of a corrosion inhibitor. Separate streams of the oil phase and aqueous acid phase were metered into an Eberbach stirrer and homogenizer at rates whereby the oil phase made up 20% by volume of the resulting emulsion and the aqueous acid phase made up 80% of the resulting emulsion. The stirrer was operated at about one-half speed as the oil and aqueous acid phases were metered thereto, and after the oil and aqueous acid phases were added to the stirrer it was accelerated to maximum speed for the stir time listed in Table I below. At the end of the stir time, the viscosity of the emulsion formed was measured using a Fann 35 viscometer, Spring No. 1, at 300 rpm, and the viscosity was measured each minute thereafter for four minutes and then again at 6 minutes. In tests 1-8 shown in Table I, particulated silica was not included in the aqueous acid phase. In tests 9-16, a quantity of particulated hydrated silica equivalent to 40 lbs. of particulated silica per 1000 gallons of aqueous acid solution was mixed with the aqueous acid solution prior to metering the solution into the Eberbach stirrer. The particle size of the particulated hydrated silica was in the range of from about 3 microns to about 60 microns with about 80% of the total particles being of a size less than 20 microns.

If the emulsion formed in the tests decreased in viscosity as determined by the Fann viscometer over the six minute period after stirring was stopped, an unstable emulsion was indicated. If the viscometer readings remained essentially the same over the six minute period, a stable emulsion was formed. The results of the tests are set forth in Table I below.

TABLE I

| Test No. | Amount of Particulated Silica Present, Gal/1000 Gal. Acid | Stirring Time, Sec. | Fann Viscometer Readings | | | | | |
|---|---|---|---|---|---|---|---|---|
| | | | At Termination Of Stirring | 1 Min. | 2 Min. | 3 Min. | 4 Min. | 6 Min. |
| 1 | 0 | 5 | 75 | — | — | — | — | — |
| 2 | 0 | 10 | 100 | 85 | 81 | — | — | — |
| 3 | 0 | 15 | 128 | 102 | 93 | — | — | — |
| 4 | 0 | 20 | 132 | 113 | 95 | — | — | — |
| 5 | 0 | 25 | 133 | 107 | 97 | — | — | — |
| 6 | 0 | 30 | 140 | 112 | 113 | 108 | 105 | — |
| 7 | 0 | 60 | 202 | 175 | 164 | 161 | 160 | 155 |
| 8 | 0 | 120 | 180 | 165 | 156 | 153 | 150 | 145 |
| 9 | 40 | 5 | 112 | 115 | 115 | 115 | 115 | 115 |
| 10 | 40 | 10 | 130 | 133 | 134 | 134 | 134 | 134 |
| 11 | 40 | 15 | 134 | 136 | 136 | 136 | 136 | 136 |
| 12 | 40 | 20 | 150 | 152 | 152 | 152 | 152 | 152 |
| 13 | 40 | 25 | 151 | 153 | 153 | 153 | 153 | 153 |
| 14 | 40 | 30 | 157 | 157 | 157 | 157 | 157 | 157 |
| 15 | 40 | 60 | 185 | 187 | 187 | 187 | 186 | 186 |
| 16 | 40 | 120 | 210 | 205 | 205 | 204 | 202 | 202 |

From Table I it can be seen that the emulsions formed without the particulated hydrated silica (tests 1-8) were all unstable in that the Fann viscometer readings decreased over the six minute time period after stirring stopped. The emulsions formed in tests 9-16 which included the particulated hydrated silica were all stable as shown by no decrease in Fann viscometer readings or very little decrease. It can also be seen from the results of tests 9-16 that stable emulsions are formed in 5 seconds or less. This accelerated emulsification allows the continuous formation of stable emulsions in accordance with the present invention.

EXAMPLE 2

Emulsions were prepared utilizing crude oil containing various quantities of the surface active agent described in Example as the oil phase. The aqueous acid phase was comprised of a 10% by weight aqueous hydrochloric acid solution containing 0.2% by volume of a corrosion inhibitor and the equivalent of 40 lbs. of particulated hydrated silica per 1000 gallons of aqueous acid solution. The particulated hydrated silica had a particle size in the range of from about 3 microns to about 60 microns with at least about 80% of the total particles being of a size less than 20 microns. The oil phase and aqueous acid phases were metered into an Eberbach stirrer and homogenizer at rates whereby the oil phase comprised 30% by volume of the resulting emulsion and the aqueous acid phase comprised 70% by volume of the emulsion. Two different crude oils were utilized in the tests, i.e., Wizzard Lake Crude Oil and Red Deer No. 2 Crude Oil with various quantities of surface active agent therein. A stirring time of 3 minutes was utilized, immediately after which viscosity readings were taken on a Fann 35 viscometer, Spring No. 1, at 300 rpm. The results of these tests are given in Table II below.

TABLE II

| Amount of Surface Active Agent Utilized, Gal/1000 Gal. of Emulsion | Amount of Particulate Hydrated Silica Utilized, lb/1000 Gal. of Acid | Crude Oil Used | Viscosity of Emulsion, CP |
|---|---|---|---|
| 10.0 | 0 | Wizzard Lake | 60 |
| 2.5 | 40 | Wizzard Lake | 245 |
| 5.0 | 40 | Wizzard Lake | 280 |
| 10.0 | 40 | Wizzard Lake | 289 |
| 10.0 | 0 | Red Deer #2 | 40 |
| 5.0 | 40 | Red Deer #2 | 260 |
| 10.0 | 40 | Red Deer #2 | 250 |

From Table II it can again be seen that particulated hydrated silica is required for a stable emulsion to be produced on a continuous basis, and that good emulsions resulted using both of the crude oils tested.

EXAMPLE 3

The procedure of Example 1 was repeated except that the oil phase and aqueous acid phase streams were metered into the Eberbach stirrer and homogenizer at rates whereby the oil phase was present in the emulsion formed in the amount of 25% by volume and the aqueous acid phase was present therein in the amount of 75% by volume. Also, viscosities were taken at one minute after stopping the stirring and then again at two minutes after stopping the stirring. Finally two different particulated silicas were utilized, the first designated in Table III below as "Coarser Silica" had a particle size in the range of from about 5 microns to about 500 microns with about 16% of the total particles being less than 20 microns. The second particulated silica designated as "Finer Silica" has a particle size in the range of from about 3 microns to about 60 microns with about 80% of the total particles being of a size less than 20 microns.

The results of these tests are set forth in Table III below.

TABLE III

| Amount of Particulated Silica Present, Gal/1000 Gal. Acid | Stirring Time, Sec. | Fann Viscometer Readings for Emulsions Including "Coarser Silica" | | Fann Viscometer Readings for Emulsions Including "Finer Silica" | |
|---|---|---|---|---|---|
| | | 1 Min. | 2 Min. | 1 Min. | 2 Min. |
| 0 | 120 | 3[1] | — | — | — |
| 40 | 5 | 112 | 115 | 103 | 100 |
| 40 | 10 | 130 | 133 | 120 | 118 |
| 40 | 15 | 134 | 136 | 148 | 147 |
| 40 | 20 | 150 | 152 | 145 | 143 |
| 40 | 25 | 151 | 151 | 158 | 153 |
| 40 | 30 | 152 | 157 | 160 | 160 |
| 40 | 60 | 185 | 187 | 198 | 198 |
| 40 | 120 | 210 | 215 | 233 | 238 |

[1] No emulsion formed

From Table III it can be seen that the finer silica appears to be more stable and provides higher viscosity in shorter stirring times.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of preparing a stable oil external-aqueous internal emulsion comprising the steps of:
    (a) mixing a particulated silica compound selected from the group consisting of hydrated silica and sodium silica aluminate having a particle size in the range of from about 5 microns to about 500 microns and having at least about 16% of the total particles of a size less than 20 microns with an aqueous liquid to form an aqueous slurry;
    (b) mixing oil with a surface active agent which promotes the formation of an oil external-aqueous internal emulsion; and
    (c) combining said aqueous slurry and said oil-surface active agent mixture to form said oil external-aqueous internal emulsion.

2. The method of claim 1 wherein said aqueous liquid is brine.

3. The method of claim 1 wherein said aqueous liquid is an aqueous acid solution.

4. The method of claim 1 wherein said particulated silica compound is selected from the group consisting of hydrated silica and sodium silica aluminate having a particle size in the range of from about 3 microns to about 60 microns and having at least about 80% of the total particles of a size less than 20 microns.

5. The method of claim 1 wherein said oil is selected from the group consisting of crude oil and diesel oil.

6. The method of claim 5 wherein said surface active agent is selected from the group consisting of a mixture of 36% by weight heavy aromatic naphtha and 64% by weight nonionic and cationic emulsifiers and a mixture of 20% by weight isopropyl alcohol and 80% by weight hydroxyethyl tall oil.

7. The method of claim 6 wherein said surface active agent is mixed with said oil in an amount which results in the emulsion containing in the range of from about 2.5 gallons to about 15 gallons of surface active agent per 1000 gallons of emulsion.

8. The method of claim 1 wherein said oil is diesel oil, and said surface active agent is a mixture of 36% by weight heavy aromatic naphtha and 64% by weight nonionic and cationic emulsifiers.

9. The method of claim 1 wherein said particulated silica compound is mixed with said aqueous liquid in an amount in the range of from about 10 lbs. to about 40 lbs. per 1000 gallons of aqueous liquid.

10. The method of claim 1 wherein said aqueous slurry is combined with said oil-surface active agent mixture in a volume ratio, respectively, in the range of from about 4:1 to about 3:1.

11. The method of claim 1 wherein continuous streams of said aqueous slurry and said oil-surface active agent mixture are combined in accordance with step (c) to continuously form a stream of said oil external-aqueous internal emulsion.

12. A method of treating a subterranean formation penetrated by a well bore comprising the steps of:
  (a) mixing a particulated silica compound having a particle size in the range of from about 5 microns to about 500 microns and having at least about 16% of the total particles of a size less than 20 microns with an aqueous liquid to form an aqueous slurry;
  (b) mixing oil with a surface active agent which promotes the formation of an oil external-aqueous internal emulsion;
  (c) combining said aqueous slurry and said oil-surface active agent mixture to form said oil external-aqueous internal emulsion; and
  (d) introducing said oil external-aqueous internal emulsion into said formation by way of said well bore.

13. The method of claim 12 wherein step (c) comprises conducting continuous streams of each of said aqueous slurry and oil-surface active agent mixture to one or more pumps wherein said streams are combined to form a continuous stream of said emulsion and said continuous stream of said emulsion is conducted to said well bore for introduction into said formation in accordance with step (d).

14. The method of claim 13 wherein said particulated silica compound is selected from the group consisting of hydrated silica and sodium silica aluminate having a particle size in the range of from about 3 microns to about 60 microns and having at least about 80% of the total particles of a size less than 20 microns.

15. The method of claim 13 wherein said treatment is a fluid diverting treatment and said aqueous liquid is brine.

16. The method of claim 13 wherein said treatment is an acidizing treatment and said aqueous liquid is an aqueous acid solution.

17. The method of claim 13 wherein said oil is diesel oil and said surface active agent is a mixture of 36% by weight heavy aromatic naphtha and 64% by weight nonionic and cationic emulsifiers.

18. The method of claim 17 wherein said particulated silica compound is mixed with said aqueous liquid in an amount in the range of from about 10 lbs. to about 40 lbs. per 1000 gallons of aqueous liquid.

19. The method of claim 18 wherein said surface active agent is mixed with said oil in an amount which results in the emulsion containing of about 10 gallons of surface active agent per 1000 gallons of emulsion.

20. The method of claim 19 wherein said aqueous slurry is combined with said oil-surface active agent mixture in a volume ratio, respectively, in the range of from about 4:1 to about 3:1.

* * * * *